(12) United States Patent
Chino

(10) Patent No.: US 11,065,540 B2
(45) Date of Patent: Jul. 20, 2021

(54) GAME EXECUTION DEVICE AND GAME PROGRAM

(71) Applicant: DWANGO Co., Ltd., Tokyo (JP)

(72) Inventor: Yuji Chino, Tokyo (JP)

(73) Assignee: DWANGO, Co., Ltd., Tokyo (JP)

( * ) Notice: Subject to any disclaimer, the term of this patent is extended or adjusted under 35 U.S.C. 154(b) by 0 days.

(21) Appl. No.: 16/650,361

(22) PCT Filed: Feb. 26, 2019

(86) PCT No.: PCT/JP2019/007321
§ 371 (c)(1),
(2) Date: Mar. 24, 2020

(87) PCT Pub. No.: WO2019/167946
PCT Pub. Date: Sep. 6, 2019

(65) Prior Publication Data
US 2020/0406139 A1    Dec. 31, 2020

(30) Foreign Application Priority Data
Feb. 27, 2018    (JP) .............................. JP2018-032975

(51) Int. Cl.
*A63F 13/86*    (2014.01)
*A63F 13/45*    (2014.01)
(Continued)

(52) U.S. Cl.
CPC .............. *A63F 13/45* (2014.09); *A63F 13/86* (2014.09); *A63F 13/533* (2014.09);
(Continued)

(58) Field of Classification Search
CPC combination set(s) only.
See application file for complete search history.

(56) References Cited

U.S. PATENT DOCUMENTS

| | | | | |
|---|---|---|---|---|
| 6,999,083 B2* | 2/2006 | Wong | ...................... | A63F 13/12 345/473 |
| 7,632,186 B2* | 12/2009 | Spanton | .................. | A63F 13/12 463/40 |

(Continued)

FOREIGN PATENT DOCUMENTS

| | | |
|---|---|---|
| JP | 2005526581 A | 9/2005 |
| JP | 2014018324 A | 2/2014 |

(Continued)

OTHER PUBLICATIONS

English machine translation of JP2015077299 provided by Patentscope. Source: https://patentscope.wipo.int/search/en/detail.jsf;jsessionid=CE696C91C7AEAFBF9BE9647723ECD48B.wapp2nA?docId=JP273617486&tab=FULLTEXT (Year: 2015).*

(Continued)

*Primary Examiner* — Steven J Hylinski
(74) *Attorney, Agent, or Firm* — Dorsey & Whitney LLP

(57) ABSTRACT

According to one aspect of the present invention, the game execution device includes a receiver, an event controller, a selector, and a generator. The receiver receives a request for generating an event based on a request for executing intervention from an auxiliary server, which receives the request for executing intervention to the game issued by a terminal of audience of a real-time play video of the game. The event controller controls events that occur in the game, at least in response to requests for generating events. The selector selects events subject to notification up to a predetermined number of the first events that occur in the game during the first period. The generator generates notification data to inform a game player of the occurrence of events subject to notification.

13 Claims, 9 Drawing Sheets

(51) Int. Cl.
  *A63F 13/87* (2014.01)
  *A63F 13/533* (2014.01)
  *A63F 13/5375* (2014.01)

(52) U.S. Cl.
  CPC .......... *A63F 13/5375* (2014.09); *A63F 13/87* (2014.09); *A63F 2300/305* (2013.01); *A63F 2300/572* (2013.01); *A63F 2300/577* (2013.01)

(56) References Cited

U.S. PATENT DOCUMENTS

| | | | | |
|---|---|---|---|---|
| 8,636,589 | B2* | 1/2014 | Harris | A63F 13/86 |
| | | | | 463/29 |
| 2003/0038805 | A1* | 2/2003 | Wong | A63F 13/12 |
| | | | | 345/473 |
| 2003/0220143 | A1* | 11/2003 | Shteyn | A63F 13/792 |
| | | | | 463/42 |
| 2007/0117617 | A1* | 5/2007 | Spanton | A63F 13/12 |
| | | | | 463/29 |
| 2013/0123019 | A1* | 5/2013 | Sullivan | A63F 13/355 |
| | | | | 463/42 |
| 2013/0288799 | A1* | 10/2013 | Harris | A63F 13/12 |
| | | | | 463/42 |
| 2014/0004951 | A1 | 1/2014 | Kern et al. | |
| 2015/0134772 | A1* | 5/2015 | Heinz, II | H04N 21/2343 |
| | | | | 709/217 |
| 2016/0236097 | A1* | 8/2016 | Sullivan | A63F 13/352 |
| 2017/0006322 | A1* | 1/2017 | Dury | A63F 13/49 |
| 2018/0250600 | A1* | 9/2018 | Trombetta | H04L 65/4076 |

FOREIGN PATENT DOCUMENTS

| | | |
|---|---|---|
| JP | 2016154741 A | 9/2016 |
| WO | 2014002537 A1 | 1/2014 |
| WO | 2015056370 A1 | 4/2015 |

OTHER PUBLICATIONS

English translation of Decision to Grant a Patent for Application No. 2018-032975, dated Jan. 8, 2019.
English translation of Notice of Reasons for Refusal for JP Application No. 2018-032975, dated Aug. 7, 2018.
English translation of Notice of Reasons for Refusal for JP Application No. 2018-032975, dated May 22, 2018.
International Search Report and Written Opinion for Application No. PCT/JP2019/007321.

* cited by examiner

Figure 3

| Type of events | Priority | Audience involvement |
|---|---|---|
| Food (low value) was dropped to the field | 1 | ○ |
| Food (high value) was dropped to the field | 2 | ○ |
| An artificial life ate the food | 5 | |
| An object (low value) was dropped to the field | 1 | ○ |
| An object (high value) was dropped to the field | 2 | ○ |
| The effect of an object was activated | 3 | |
| A new artificial life was dropped to the field | 4 | ○ |
| An artificial life was transferred from the field | 2 | ○ |
| An artificial life was given a name | 2 | ○ |
| Risk for death of a named artificial life | 3 | |
| Death of a named artificial life | 3 | |
| Risk for destruction of a clan (alert) | 3 | |
| Risk for destruction of a clan (warning) | 3 | |
| Destruction of a clan | 3 | |

GAME EXECUTION DEVICE AND GAME PROGRAM

RELATED APPLICATIONS

This application is a 371 National Stage application of International Application No. PCT/JP2019/007321, filed Feb. 26, 2019, which claims priority to Japanese Patent Application No. 2018-032975 filed on Feb. 27, 2018. The aforementioned applications are incorporated herein by reference, in its entirety, for any purposes.

TECHNICAL FIELD

The present invention relates to a game execution device or a program that provides an interactive gaming experience.

BACKGROUND ART

Video games can be divided roughly into either stand-alone-type games or online games (such as cloud games, MO (multiplayer online) games, MMO (massively multi-player online) games). Also, online games can further be categorized into a C/S (client/server) type and a P2P (peer to peer) type. The stand-alone-type games and P2P-type online games are realized as a player's terminal executes a game program, and from one to 20-30 players at most play the game. On the other hand, particularly the C/S-type games are realized as a game server connected to a player's terminal at least partially executing a game program. The MMO-type games allow a few hundred to a few million players to play by simultaneously connecting to a network.

A basic mechanism of a video game is repetition of communication between a player and a game program, in which the player recognizes the output of the game program such as a game screen, sound, and vibration; the player makes a decision based on the output and inputs an operation; and the game program transitions a game status and further generates an output based on the operation.

In recent years, in a video sharing system, videos of a genre called live game streaming are coming into fashion. Live game streaming is a content-sharing method that takes the form of live broadcasting (streaming) of real-time play of a game by a player (contributor) to a large number of audiences. Through live game streaming, audiences, other than players, can enjoy a simulated experience of a game.

In addition, some video sharing systems allow audiences to give comments to live streaming videos. In live game streaming, comments given by audiences can be viewed in real time by contributors in addition to other audiences. Contributors may play according to advisory comments or comments of requests from the audience, to which the audience may give more comments, and thereby create an interactive gaming experience.

Further, Japanese Published Unexamined Patent Application 2016-189804 discloses obtaining/compiling comments that are given while a game playing video is being viewed and selecting a presentation method [0011]. However, although Japanese Patent Application 2016-189804 defines presentation methods with different effects, background materials, and screen decoration, it states that any of such presentation methods should not alter the game playing contents themselves but change only the appearance ([0085], [FIG. 18]).

SUMMARY OF THE INVENTION

With a mechanism in which the audience can give comments to a live streaming video and a contributor can view the comments, the audience can only have limited impact on game progress. For example, even if the audience gives however many comments, their comments will not influence game progress if the contributor overlooks or ignores them. As such, in traditional live game streaming, it is only a contributor who can directly be involved in game progress, and the intention of the audience does not influence game progress independently of the intention of the contributor.

On the other hand, it can be envisaged that the audience of live game streaming may intervene game progress by creating (sub)events such as dropping an item. Based on such framework, in a game, in addition to events generated by the operation of a contributor as player, as well as events generated automatically according to game progress, events by the intervention of the audience would also be generated. This signifies that more events can be generated compared to when only a player plays a game.

If a large number of audiences request intervention simultaneously, and thus a number of events that exceed the cognitive capacity of a contributor and audience are generated and concentrated in a short period of time, even if each event generated is notified every time, it would be difficult for the contributor and the audience to understand the status of the game. This would incur a loss of excitement of the game and game playing video or hinder communication between a contributor and an audience or among audiences, potentially failing the interactive gaming experience. Further, by attempting to notify the occurrence of a large number of events in a short time period, processing loads of a game execution agent (a game server or a contributor's terminal) will increase.

Japanese Published Unexamined Patent Application 2013-106858 describes a game server device containing an acceptor ([0026]) that receives game inputs; an executing and processor ([0027]) that executes and processes a game according to the received game inputs; and a determiner ([0035]) that determines the enabling or disabling of the game input reception from a plurality of game inputting devices at synchronized timing according to a schedule, in order for computer loads at the server side not to become excessive (Abstract) in a combating/automatic execution type game (0021).

Japanese Published Unexamined Patent Application 2013-135761 describes that, in order to control the increase of control load in displaying non-player characters' messages [0007], messages are appropriately selected based on priority (thinned out), in which the selection is done by not thinning out messages with the highest priorities ([0063]).

The present invention aims to avoid adverse effect by notifications when event occurrence is concentrated in a short time period.

According to one aspect of the present invention, the game execution device includes a receiver, an event controller, a selector, and a generator. The receiver receives a request for generating an event based on a request for executing intervention from an auxiliary server, which receives the request for executing intervention to a game issued by a terminal of audience of a real-time play video of the game. The event controller controls the event that occurs in the game, at least in response to requests for generating the event. The selector selects the event subject to notification up to the predetermined number of first events that occur in the game during the first period. The generator generates notification data to inform a game player of an occurrence of the event subject to notification.

With the present invention, it is possible to avoid adverse effect of notifications when event occurrence is concentrated in a short time period.

BRIEF DESCRIPTION OF THE DRAWINGS

FIG. 3 is a diagram illustrating a priority table.

BEST MODE FOR CARRYING OUT THE INVENTION

In what follows, with reference to the accompanying drawings, embodiments of the present invention will be explained. In the following sections, elements identical or similar to ones that have been explained are indicated by reference symbols accordingly. Overlapping explanations, in principle, are omitted. For example, when there exists a plurality of elements that are identical or similar to each other, a common symbol may be used to explain each element without distinction. A branch number, in addition to the common symbol, may also be used in order to distinguish and explain each element.

First Embodiment

Figure 1:
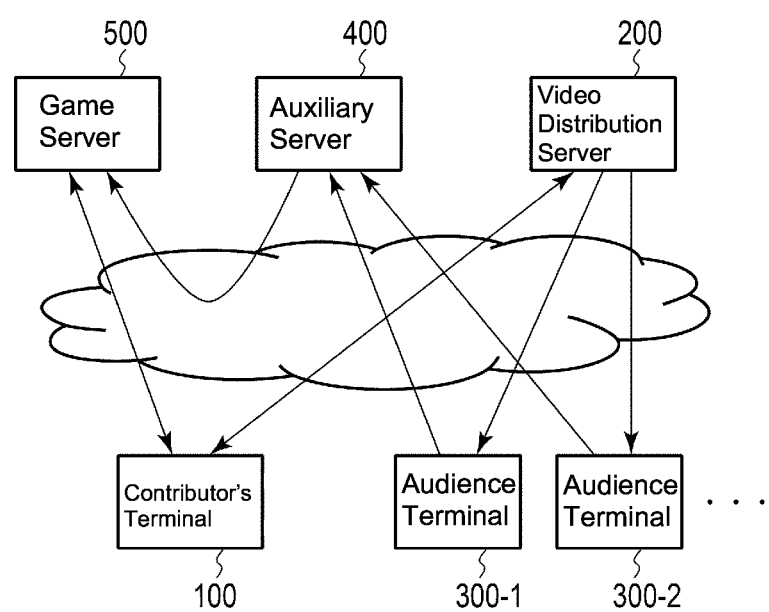
FIG. 1 is a block diagram showing an example of a distribution system of a real-time play video of a game, including a game server according to a first embodiment.

A game server according to the first embodiment can be integrated in a distribution system of a real-time play video of the game in FIG. 1. The distribution system includes a contributor's terminal 100, a video distribution server 200, audience terminals 300-1, 300-2, . . . , an auxiliary server 400, and a game server 500.

In the example of FIG. 1, the video distribution server 200 distributes a real-time play video of a C/S-type online game executed on the contributor's terminal 100 (the client) and the game server 500 (the server) to the audience terminal 300 (and the contributor's terminal 100).

Here, the game may be a game for growing an artificial life. In the growing game, a player can transfer an artificial life to a virtual world called a field and enjoy watching its mode of life or the way the artificial life formulates a group (a clan) and coexists with another group. The player can drop an item that supplements the energy of the artificial life (food) or an object that has other effects for purposes such as preventing the death of the artificial life that the player owns or the destruction of the clan that the player's artificial life belongs to or benefitting the clan. In this system, not only the contributor who is the player but also the audience, together with the player (the contributor), can support a preferred artificial life or a clan that the preferred artificial life belongs to, or on the contrary, interrupt the activities of the hostile forces, by executing such intervention using the auxiliary server 400.

The contributor's terminal 100 executes a game program (a client-side program). The contributor's terminal 100 receives the execution result of a game program (a server-side program) from the game server 500 and outputs a game screen/sound (may include vibration, or other feedback). The contributor as a player recognizes the output. Here, the execution result of a game program may be, for example, (the encoded data of) a game screen/sound itself, or data necessary to generate a game screen/sound such as the game status. For example, in a cloud game, a game screen/sound itself can be transmitted to the contributor's terminal 100.

In the latter example, the contributor's terminal 100 needs to store a game's material data, image data such as characters, objects, backgrounds, and visual effect, sound data such as sound effect (SE), BGM (background music), and character voice, and vibration patterns in a main memory or an auxiliary storage device.

The player recognizes the output from the contributor's terminal 100, based on which the player inputs an operation into the contributor's terminal 100. The contributor's terminal 100 sends the operation data of the player to the game server 500. In addition, the contributor's terminal 100 sequentially encodes a game screen/sound, and if necessary, additional image/sound, and sends (uploads) the encoded data to the video distribution server 200. Here, the additional image/sound may include, for example, an image that captures the contributor or the live sound of the contributor.

The contributor's terminal 100 can be, but not limited to, a digital device such as a computer capable of executing a game program (a client-side program), including a PC (personal computer), a mobile terminal (a tablet, a smartphone, a laptop, a feature phone, a portable game console, a digital music player, a digital book reader, etc.), a VR (virtual reality) terminal, an AR (augmented reality) terminal, a game console, and a television receiver (including an Internet television).

The contributor's terminal 100 may be physically separated into a device that executes a game program (a game execution device) and one that encodes an image/sound and sends the encoded multimedia data (an encoding/uploading device). Also, in such a case, game screen/sound data may or may not be output directly from the game execution device to the encoding/uploading device. In the latter case, for example, by capturing a screen of a display device connected to the game execution device and recording output sound from a speaker, the encoding/uploading device can import the game screen/sound data.

The video distribution server 200 is connected to the contributor's terminal 100 and the audience terminal 300 via a network and can send and receive data with each other. The video distribution server 200 sequentially receives the encoded data from the contributor's terminal 100 and sends the data to the audience terminal 300.

The audience terminal 300 issues an execution request for intervening the game based on operation input from a user and sends the request to the auxiliary server 400. The audience terminal 300 can be a digital device similar to the contributor's terminal 100. However, the audience terminal 300 does not need capability to execute a game program.

The auxiliary server 400 is connected to the audience terminal 300 and the game server 500 via a network. The auxiliary server 400 receives the request for executing intervention from the audience terminal 300, based on which it sends a request for generating an event to the game server 500. The request for generating an event can include, for example, data indicating a type of event to be requested and data indicating an audience, who is the subject of the request (hereinafter the requester). In the following explanations, events and sub-events are not distinguished, which are both called events.

As the auxiliary server 400 operates in such manner, for example, at least a part of the intention of the audience viewing a real-time play video of the game can have an impact on the game progress, and ultimately influence the real-time play video that the audience views, realizing an interactive gaming experience with a strong sense of togetherness.

The auxiliary server 400 may conditionally receive a request for executing intervention from the audience terminal 300. Specifically, the auxiliary server 400 may accept intervention to the game by the audience with the condition that the audience pay a price (hereinafter this will also be called intervention price). Here, the intervention price may be represented by real cash or virtual cash (including points) that can be used in video distribution services. When the audience wants to execute an intervention to a game, they issue a request for execution by operating the audience terminal 300 upon agreeing to pay the intervention price displayed on the audience terminal 300. When receiving the execution request for intervention from the audience terminal 300, the auxiliary server 400 executes the intervention to the game in exchange for the intervention price displayed on the audience terminal 300. The payment processing of the intervention price may be done by the auxiliary server 400 or a payment server other than the auxiliary server 400.

The game server 500 is connected to the contributor's terminal 100 via a network and can send and receive data with each other. The game server 500 executes a game program. The game server 500 according to the first embodiment can be called a game execution device.

The game server 500 transitions a game status based on the operation data of a player sent from the contributor's terminal 100 and a request for generating an event sent from the auxiliary server 400. The game server 500 sequentially sends the execution results of the game program to the contributor's terminal 100.

The game server 500 generates notification data that notifies a player of the occurrence of at least a portion of an event that occurs based on the operation data of the player and a request for generating an event, as well as an event that automatically occurs according to the game progress. However, the game server 500 limits the number of events subject to notification during a unit of a period and does not notify events that exceed the predetermined number (for example, one event) when the occurrence of events is concentrated in a short time period. By this, it is possible to avoid a situation where game experience provided to the player and audience fails while allowing the player and audience to understand the game status to some extent. Also, the load on the game server 500 due to notifications does not increase over a certain upper limit.

The number of each device described in FIG. 1 is merely an illustration. For example, since the number of the audience terminal 300 changes from moment to moment, it can become 0, a few hundred or a few thousand. Also, a web server or a comment distribution server not shown in FIG. 1 may be provided.

The following sections explain the game server 500 in detail using FIGS. 2 to 8. The game server 500 is a computer, for example it contains a processor that handles input and output control, communication control, and game execution (that is, event control, selection of events subject to notification that is explained later, generation of notification data, etc.). Additionally, the game server 500 contains a memory that temporarily stores a program that is executed by the processor to achieve the processing and data used by the processor, etc.

The game server 500 may handle all data at an on-memory state, or a part of the data may be saved to an auxiliary storage device. The auxiliary storage device may be, for example, a built-in or external HDD (hard disc drive), an SSD (solid state drive), or a flash memory. It can also be a database server accessible from the game server 500.

Further, the game server 500 may be a combination of a plurality of computers. For example, the functional unit of the game server 500, that is, a communicator 510, a game executor 520, and various storages, which are explained later, may be distributed and implemented on separate computers.

The game server 500 can further use a communication I/F (interface) to connect to a network. The communication I/F may be built in the game server 500 or externally attached to the game server 500.

The communication I/F can be a module in order to communicate with the contributor's terminal 100 and the auxiliary server 400 via the network. For example, the communication I/F receives operation data of a player from the contributor's terminal 100, or on the contrary, sends the execution results of a game program to the contributor's terminal 100. In addition, the communication I/F receives a request for generating an event from the auxiliary server 400. Further, the communication I/F can receive attribute data (explained later) of a requester from the auxiliary server 400 or the video distribution server 200.

Next, an example of the configuration of the game server 500 will be explained further using FIG. 2. The game server 500 in FIG. 2 contains a communicator 510, a game executor 520, and various storages.

The communicator 510 may be, for example, the aforementioned communication I/F. It receives data from an external device, such as the contributor's terminal 100, the auxiliary server 400, etc., or sends data to external devices. Specifically, the communicator 510 contains a receiver 511 and a transmitter 512.

The receiver 511 receives operation data of a player from the contributor's terminal 100. In addition, the receiver 511 receives a request for generating an event from the auxiliary server 400. Further, the receiver 511 receives attribute data of the audience from the auxiliary server 400 or the video distribution server 200. The receiver 511 sends the received data to the game executor 520. Specifically, the receiver 511 sends attribute data of the audience to an attribute acquirer 521. While the attribute data will be explained later in detail, it does not necessarily need to be data independent of a request for generating events, to which attribute data of the requester can be added. Also, the receiver 511 sends operation data of a player and a request for generating events at least to an event controller 522.

The transmitter 512 receives the execution results of a game program from the game executor 520 and sends them to the contributor's terminal 100. Here, the execution results of a game program contain, at least, data indicating events occurring in the game as well as notification data that is explained later. As previously mentioned, the execution result of a game program may be (the encoded data of) a game screen/sound itself, or data necessary to generate a game screen/sound such as a game status. In the latter case, data indicating events can, for example, contain event IDs, event types, time and place of event occurrence, etc. Notification data can contain event IDs to be notified, and also data indicating the notification mode as necessary (such as the order and time of notifications).

The game executor 520 may be the aforementioned processor and memory and executes a game program (a server-side program). The game executor 520 receives data such as operation data of a player and event generation requests from the communicator 510 and reads necessary data from various storages, based on which it transitions a game status and generates notification data. For example, the game executor 520 adds a new character, item, or object to virtual space, or removes an existing character, item or object from virtual space, or alters their status. The game executor 520 returns the execution results to the communicator 510. Specifically, the game executor 520 contains the attribute acquirer 521, the event controller 522, a notification subject selector 523, and a notification data generator 524.

The attribute acquirer 521 acquires attribute data indicating the attributes of a requester or audience through the communicator 510. The attribute acquirer 521 stores the attribute data in the attribute storage 531.

The attributes of a requester can be secondarily referenced during selection of target events for notification (events subject to notification). In other words, when events are selected in a descending order according to priorities explained later, candidates are narrowed down based on the attributes of a requester if the number of candidates exceeds a predetermined number (the upper limit of events subject to notification). However, it is possible not to use attributes of a requester at all in selecting events subject to notification. In such case, the attribute acquirer 521 and the attribute storage 531 can be removed.

Here, the attributes of a requester can, for example, contain the time when the requester started to view a real-time play video of the game. Such information can be obtained, for example, from the video distribution server 200. Also, the attributes of a requester can contain the time when the requester requested the execution of intervention. Such information can be obtained, for example, from the auxiliary server 400. Additionally, the attributes of a requester can contain the number of occasions when events that occurred in the game by the requester's requests were selected as events subject to notification (within a certain unit period). Such information can be managed on the game server 500 based on, for example, the output from the notification subject selector 523. Specifically, the notification subject selector 523 can add, for each requester of the events subject to notification during a unit period, by one increment to the number of selections of events subject to notification stored in the attribute storage 531.

The event controller 522 receives operation data of a player and requests for generating events from the receiver 511. The operation data of a player and requests for generating events are both independent data, thus the event controller 522 receives them at independent timing.

The event controller 522 controls events occurring in a game in response to each of the operation data of a player and requests for generating events. In addition, the event controller 522 may, depending on game program specifications, generate events according to the progress of a game without receiving either a player's operation data or a request for generating events. The event controller 522 sends data indicating events occurring in a game to the transmitter 512 and the notification subject selector 523. When the game server 500 generates (encoded data of) a game screen/sound and sends it to the contributor's terminal 100, the event controller 522 may send data indicating events occurring in a game to a game screen/sound generator not shown in a figure instead of the transmitter 512.

The notification subject selector 523 receives from the event controller 522 data indicating events that occur in the game. The notification subject selector 523 selects events subject to notification from events that occur in the game during each unit period up to a predetermined number for the unit period. The notification subject selector 523 sends data indicating the events subject to notification to the notification data generator 524. Here, the predetermined number of events may be one or more. Also, the predetermined number of events may be a fixed or variable value. For example, since it is presumed that human cognitive ability on notifications of events in a game somewhat varies depending on the person's ability to process information or play experience of the game, the predetermined number of events may be freely established by a contributor or the audience. In addition, a unit period can be fixed or variable duration.

Specifically, the notification subject selector 523 may select events subject to notification in descending order according to priority that is predefined for each event type. Or, the notification subject selector 523 may randomly select events subject to notification or in order starting with the earliest or latest occurring events. However, in the following explanations, the notification subject selector 523 is to select events subject to notification in descending order according to priority.

Selecting events subject to notification in descending order of priority has an effect that events with large impact on game progress is less likely to filter out from events subject to notification. For each event occurring during a unit period, the notification subject selector 523 retrieves from a priority storage 533 a priority assigned to the type of the event.

An example of a priority table that associates event types and their priorities is shown in FIG. 3. In FIG. 3, the priorities are given in five levels from 5 (the highest) to 1 (the lowest). Additionally, a ◯ is given to events which the audience can become involved in, or in other words, request their occurrence. Therefore, for example, if the predetermined number of events is "1," and "food (low value) was dropped in the field" (Priority 1), "an effect of an object was activated" (Priority 3), and "a new artificial life form was dropped in the field" (Priority 4) occur within the same unit period, the notification subject selector 523 will select "a new artificial life form was dropped in the field" with the highest priority as an event subject to notification. Since FIG. 3 is only an example, the priorities can be allocated differently from FIG. 3.

Here, a boundary value is set as a priority that falls on a predetermined number when the priorities allocated to an event occurring in a unit period are sorted in descending order. Thus, events subject to notification is always given priorities equal to or higher than the boundary value. However, when there are a plurality of events assigned with a priority equal to the boundary value, the number of candidates of events subject to notification can exceed the predetermined number of events. In this way, among events occurring within a unit period, when those given a priority equal to or higher than the boundary value exceed the predetermined number of events, the notification subject selector 523 may select a portion of events given a priority equal to the boundary value as an event subject to notification based on the attributes of the requester. The notification subject selector 523 retrieves the attribute data of each requester of the event given a priority equal to the boundary value from the attribute storage 531.

In an event where no requester exists, for example, an event that occurs based on the operation data of a player, or an event that is automatically generated according to game progress, certain attribute data (attribute values) may be set as default.

For example, the notification subject selector 523 can give priority to an event that occurs by a request of a requester whose start time of viewing a real-time play video of the game is more recent than others. By this, for example, it can be expected to floating customers to stay in the game. Contrarily, the notification subject selector 523 can give priority to an event that occurs by a request of a requester whose start time of viewing a real-time play video of the game is earlier than others. By this, it can be expected to maintain or improve the viewing/intervening motivation of regular customers.

Also, the notification subject selector 523 can give priority to an event that occurs by a request of a requester who has the least number of acceptance of events subject to notification. By this, since it becomes easier to uniformly pay attention to intervention by each requester, the viewing/intervening motivation is less likely to decrease. Further, the notification subject selector 523 may give priority to an event that occurs by a request from a requester whose request for executing intervention is more recent or earlier than others.

The notification subject selector 523 may either narrow down the candidates based on one attribute or a plurality of attributes. In the latter example, the narrowing-down may be done based on indexes by combining and indexing a few attributes, or it may be done in order based on a single attribute.

Among events occurring within a unit period, when those given a priority equal to or higher than the boundary value exceed the predetermined number of events, the notification subject selector 523 may randomly select a portion of events given a priority equal to the boundary value as an event subject to notification. In addition, the notification subject selector 523 may randomly select events subject to notification from the remaining candidates when the narrowing-down of candidates is insufficient despite using the aforementioned attributes of a requester.

Since the number of events occurring during a unit period is not necessarily constant, more events than the predetermined number of events may occur while less events than the predetermined number of events may occur. In the latter case, the notification subject selector 523 can select all events as those subject to notification. Further, when the number of events occurring during a unit period is less than the predetermined number of events, there will be space in resources for event notification (time and/or space within a screen) even after notifying all events that occur during the unit period. In such a case, the notification subject selector 523 may select an event that occurred in the past unit period but not selected as an event subject to notification during the unit period in the past (hereinafter "un-notified event"). By this, within a range that does not exceed the cognitive ability of a player or the audience, it becomes possible to inform a player and the audience of more event occurrence.

In order to realize the notification with time difference pertaining to the un-notified events, it is necessary to manage data indicating un-notified events. The notification subject selector 523 selects events subject to notification for each unit period while storing data indicating un-notified events during the unit period, for example, by associating such data to data indicating the unit period, in an un-notified event storage 534. Then, the notification subject selector 523 retrieves the data indicating the un-notified events from the un-notified event storage 534 when the number of events occurring during a unit period is less than the predetermined number of events.

The notification subject selector 523 may, for example, determine a portion of the un-notified events as events subject to notification in consideration of the aforementioned priorities, a requester's attributes, etc. Also, the notification subject selector 523 may further consider elapsed time from the occurrence of an un-notified event. For example, the notification subject selector 523 may give priority to an un-notified event of which the elapsed time from its occurrence is short. By this, it is possible to avoid causing more confusion to a player and the audience by notifying the occurrence of events that are too old. In addition, without the notification subject selector 523 directly considering elapsed time from the occurrence of an un-notified event, for example, data indicating un-notified events of which elapsed time is equal to or more than a threshold may be deleted from the un-notified event storage 534, or limit the number of storage of the data in the un-notified event storage 534 to the newest U (U is an arbitrary natural number).

The notification data generator 524 receives data indicating events subject to notification from the notification subject selector 523 and generates notification data to inform a player of occurrence of the events subject to notification (and, that is, to ultimately inform the audience). The notification data generator 524 sends notification data to the transmitter 512.

Here, the notification data can be data used to superimpose image data which informs a player of occurrence of events subject to notification onto a game screen displayed on the contributor's terminal 100 (for example, picture-in-picture display). Specifically, the notification data may be the image data itself, or data necessary to depict the image data on the contributor's terminal 100. Also, the image data may include the information of time and/or place of the occurrence of events subject to notification. By this, a player and the audience can recognize the game status more accurately. Additionally, the image data may include the information about a requester of an event subject to notification. By this, it can be expected to maintain or improve the viewing/intervening motivation of requesters.

Figure 5:
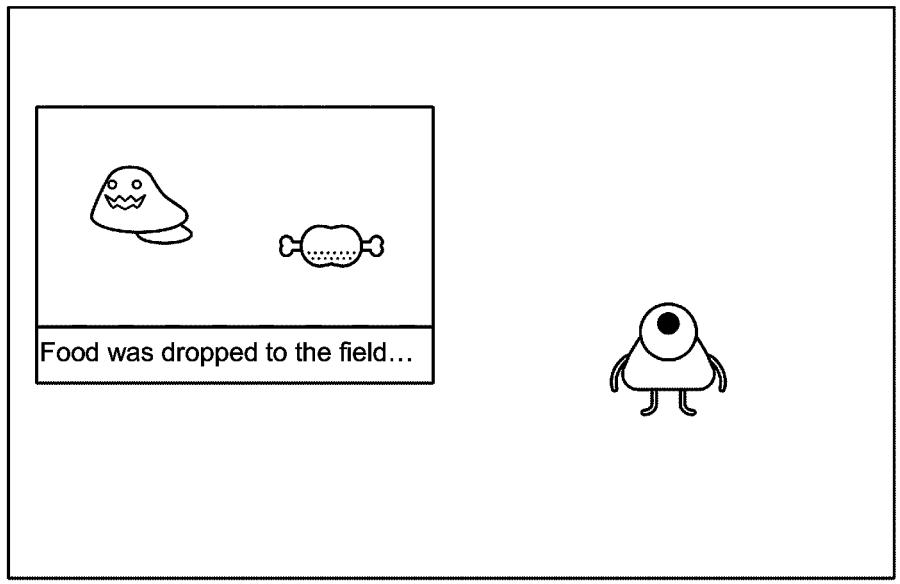
FIG. 5 is a diagram showing an example of notification data.
Figure 6:
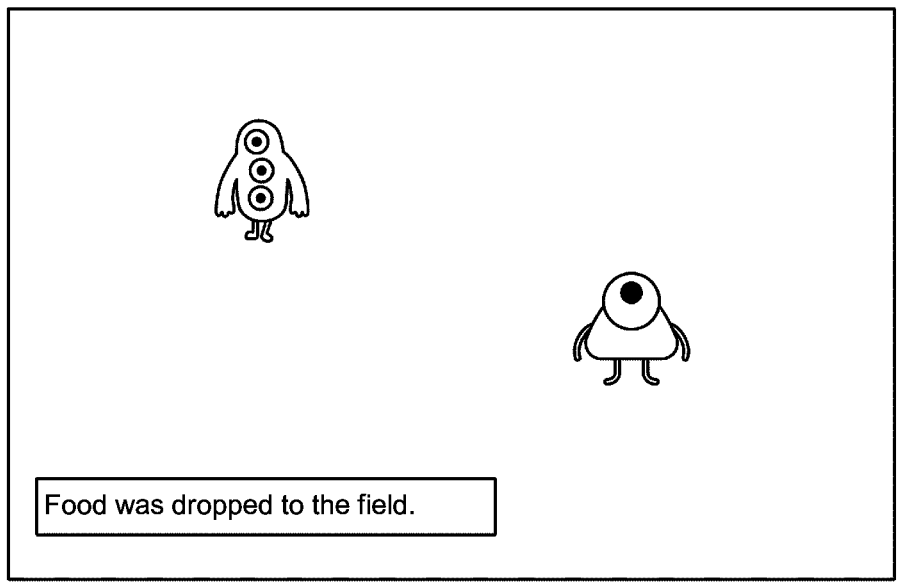
FIG. 6 is a diagram showing another example of notification data.

The image data can, for example, as shown in FIG. 5, include a sub-screen of the vicinity, where an event subject to notification occurs, which is viewed from a perspective different from the (virtual) perspective of a game screen. According to the image data of FIG. 5, the player and the audience can visually recognize the occurrence of an event subject to notification. Or, the image data may, for example, as shown in FIG. 6, include a text image that describes the occurrence of an event subject to notification. According to the image data of FIG. 6, when compared to the example of FIG. 5, it is possible to control a display area of the main game screen to be shielded. The image data of FIGS. 5 and 6 can be used in combination. Which image data to be used can be set by a player or the audience, switched according to a type of event subject to notification, or switched according to the selection order of the events subject to notification in the notification subject selector 523 (for example, image data of FIG. 5 is used up to the top A events in the selection order (A is an arbitrary natural number) and the image data of FIG. 6 is used for the remaining events).

When a multi-view delivery is being conducted in the system of FIG. 1, the image data can be utilized as a link to a different perspective. In other words, when the audience select a sub-screen, shown in FIG. 5 for example, on the audience terminal 300, the main perspective delivered to the audience terminal 300 can be switched to a perspective corresponding to the sub-screen.

Or, the notification data can be data to output sound data that informs a game player of the occurrence of events subject to notification from the contributor's terminal 100. That is, the notification data can be text data describing the occurrence of events subject to notification (this will be subject to TTS (Text-To-Speech) processing on the contributor's terminal 100), or (encoded data of) sound data obtained from the text data by the TTS processing.

Figure 4:
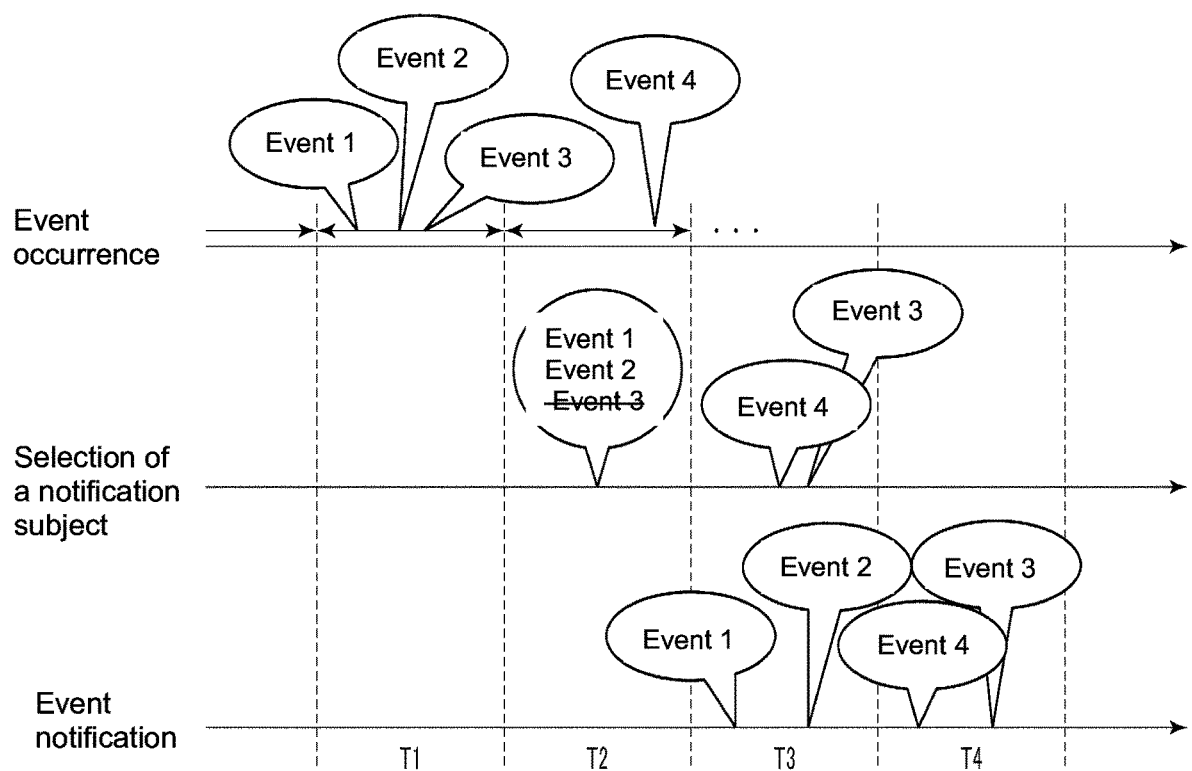
FIG. 4 is a conceptual diagram showing an operation pertaining to event notification in the game server in FIG. 2.

Here, by using FIG. 4, how a game server 500 operates pertaining to event notifications will be explained conceptually. In the example of FIG. 4, it is assumed that the event 1, event 2, and event 3 occur during the unit period T1, followed by the event 4 during the unit period T2. It is also assumed that the predetermined number of events (the upper limit of events subject to notifications) during the unit periods T1 and T2 is set as two.

First, the event controller 522 determines that the events 1, 2, and 3 will occur during the unit period T1. The event controller 522 sequentially reports such information to the notification subject selector 523.

Later, the notification subject selector 523 selects up to two events subject to notification from the events 1, 2 and 3 that occur during the unit period T1. In the example of FIG. 4, the notification subject selector 523 selects the events 1 and 2 as events subject to notification, and stores data indicating the event 3 as an un-notified event in the un-notified event storage 534. In the example of FIG. 4, although the notification subject selector 523 selects events subject to notification during the unit period T2, this is only an example. In principle, the notification subject selector 523 can select events subject to notification during the unit period T1 at any timing after the event controller 522 determines events to occur by the expiration of the unit period T1.

Then, by the notification data generated by the notification data generator 524, the occurrence of the events 1 and 2 are notified on the game screen displayed on the contributor's terminal 100. In the example of FIG. 4, although the occurrence of the events 1 and 2 are notified during the unit period T3 following the unit period T2, this is only an example. In principle, the notification of the event subject to notification is possible at any timing after the event subject to notification during the unit period T1 being selected by the notification subject selector 523, the notification data being generated by the notification data generator 524, and the data being transmitted to the contributor's terminal 100.

Further, the event controller 522 determines that the event 4 will occur during the unit period T4. The event controller 522 reports such information to the notification subject selector 523.

Later, the notification subject selector 523 selects the event 4 that occurs during the unit period T2 as an event subject to notification. In the example of FIG. 4, since the predetermined number of events during the unit period T2 is set as two, the notification subject selector 523 further selects the event 3, which is an un-notified event, as an event subject to notification. That is, the notification subject selector 523 selects the events 3 and 4 as the events subject to notification during the unit period T2. In the example of 4, although the notification subject selector 523 selects events subject to notification during the unit period T3, this is only an example. In principle, the notification subject selector 523 can select events subject to notification during the unit period T2 at any timing after the event controller 522 determines events to occur by the expiration of the unit period T2.

Then, by the notification data generated by the notification data generator 524, the occurrence of the events 3 and 4 are notified on the game screen displayed on the contributor's terminal 100. In the example of FIG. 4, although the occurrence of the events 3 and 4 are notified during the unit period T4 following the unit period T3, this is only an example. In principle, the notification of the event subject to notification is possible at any timing after the event subject to notification during the unit period T2 being selected by the notification subject selector 523, the notification data being generated by the notification data generator 524, and the data being transmitted to the contributor's terminal 100.

Figure 2:
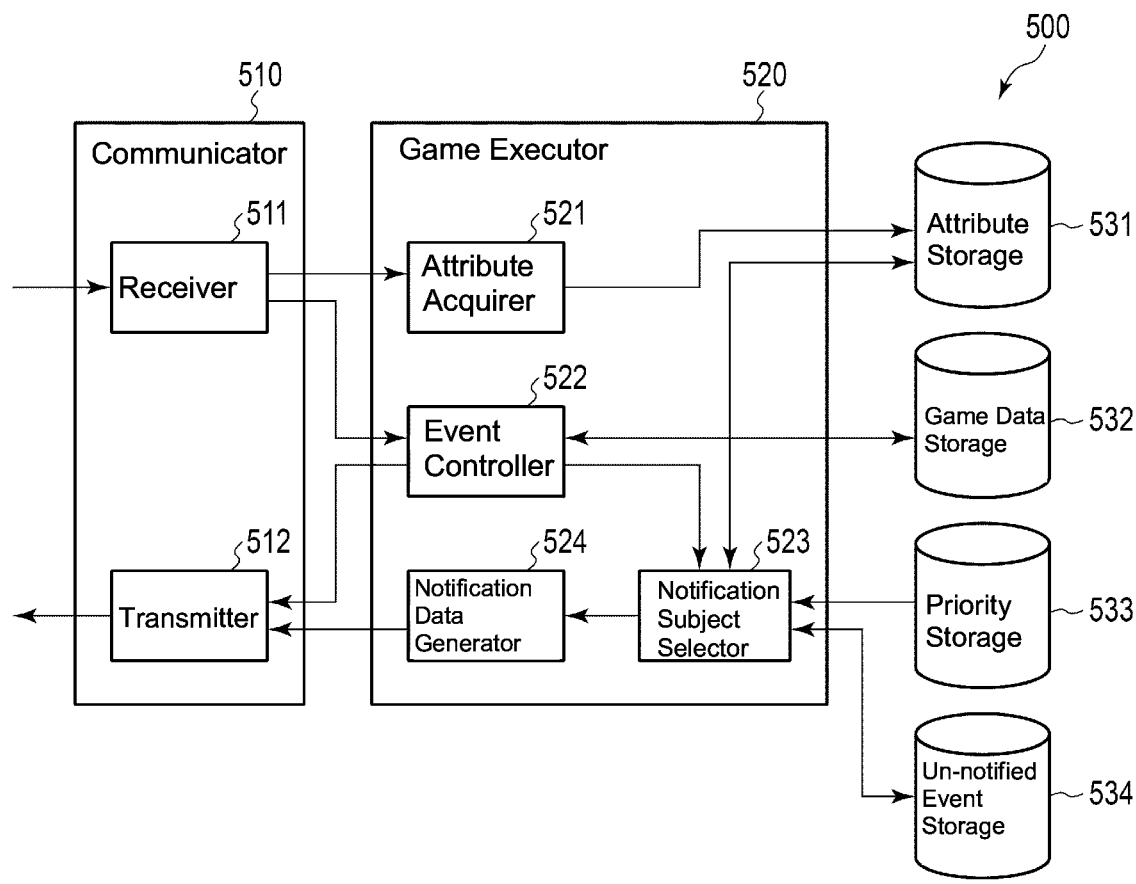
FIG. 2 is a block diagram illustrating the game server in FIG. 1.

In the example of FIG. 2, various storages include an attribute storage 531, a game data storage 532, the priority storage 533, and the un-notified event storage 534. These storages can be the aforementioned memory alone or a combination of memory and auxiliary storage devices.

The attribute storage 531 stores attribute data indicating the attributes of a requester or the audience. The attribute data is written, or rewritten, by the attribute acquirer 521 and/or the notification subject selector 523. Also, the attribute data is retrieved by the notification subject selector 523.

The game data storage 532 stores various game data used by a game program. The game data can be written, or rewritten, in the game data storage 532 when a game program is installed or updated. The game data is retrieved by the event controller 522. In the example of FIG. 2, since the game server 500 does not necessarily generate a game screen/sound, the game data does not necessarily contain material data.

The priority storage 533 stores priorities by associating them with event types, for example, as in the form of a priority table shown in FIG. 3. The priority can be written, or rewritten, in the priority storage 533, for example, when a game program is installed or updated. The priority is retrieved by the notification subject selector 523.

The un-notified event storage 534 stores data indicating the aforementioned un-notified events. This data is written, or rewritten, by the notification subject selector 523. Also, the attribute data is retrieved by the notification subject selector 523.

Next, by using FIG. 7, an operation example of the game server 500 during one unit period will be explained.

First, the receiver 511 receives a request for generating an event from the auxiliary server 400 (step S710), or it receives a player's operation data from the contributor's terminal 100 (step S720). Then, the event controller 522 controls events based on the request for generating events that has been received in step S710, or on the operation data of a player that has been received in step S720 (step S730). Specifically, the event controller 522 determines which event is generated.

Such processing is repeated until all events to occur haven been selected up to the expiration of a unit period (step S735), and the processing proceeds to the step S740. On the other hand, the operation in FIG. 7 can be initiated in parallel with the subsequent unit period. In other words, the event controller 522 starts controlling events that will occur in the subsequent unit period.

Figure 7:
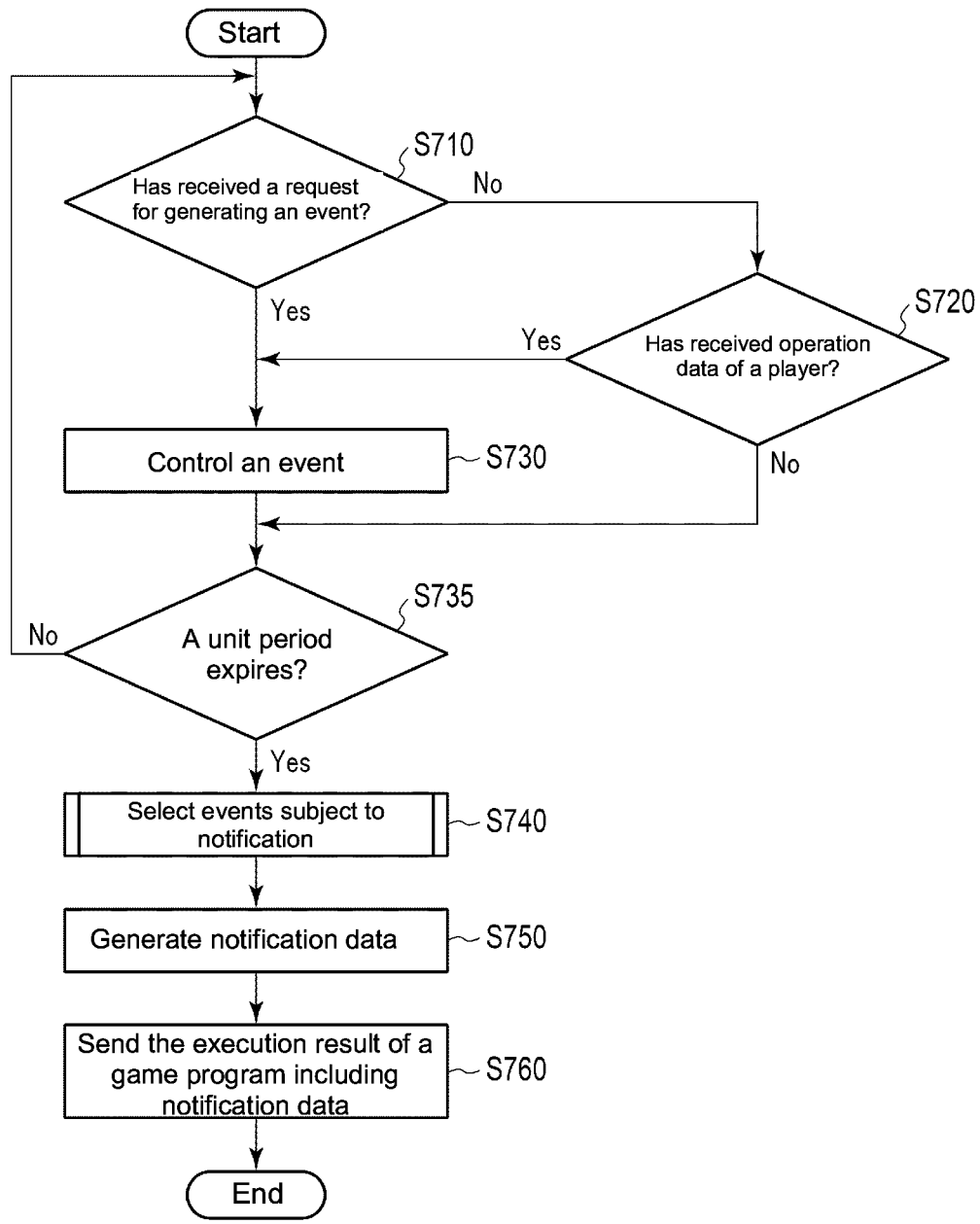
FIG. 7 is a flowchart illustrating an operation of the game server in FIG. 2.

FIG. 7 is only an example, and the event controller 522 may automatically determine the occurrence of events according to game progress even when it does not receive either a request for generating an event or the operation data of a player.

In step S740, the notification subject selector 523 selects events subject to notification up to the predetermined number of events from those that are determined in step S730 and occurring during a unit period. The detail of step S740 will be explained using FIG. 8 after the explanation of FIG. 7.

Next, the notification data generator 524 generates notification data that informs a player of the occurrence of events subject to notification, which have been selected in step S740 (step S750). Then, the transmitter 512 sends the execution results of a game program, including the notification data generated in step S750, to the contributor's terminal 100 (step S760).

Figure 8:
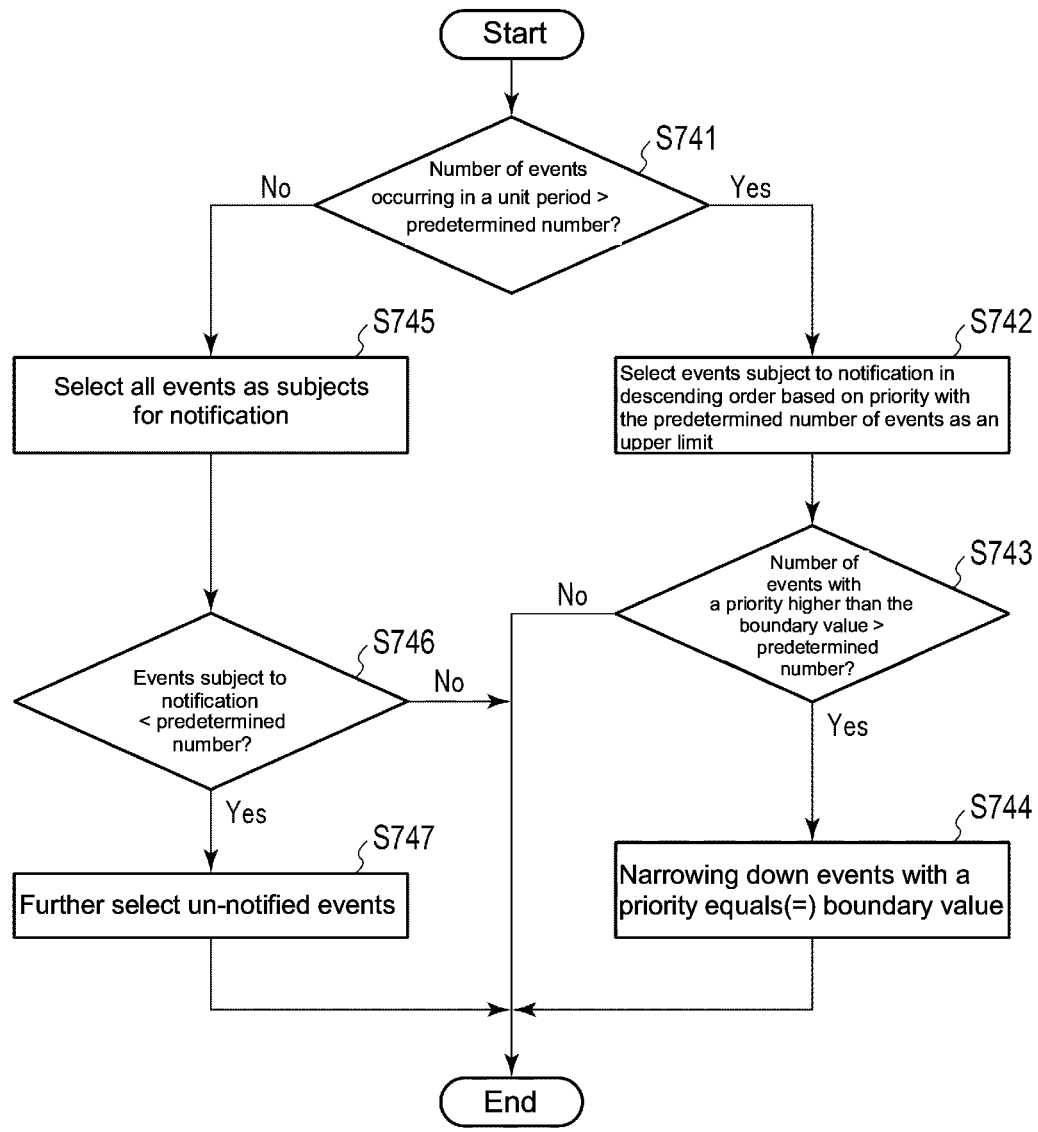
FIG. 8 is a flowchart illustrating the details of the step S740 in FIG. 7.

Next, step S740 in FIG. 7 will be explained in detail using FIG. 8.

First, the notification subject selector 523 calculates the number of events occurring within a unit period, and determines whether the number exceeds the predetermined number of events assigned to the unit period (step S741). When the number of events occurring during the unit period exceeds the predetermined number, the processing proceeds to step S742; otherwise, the processing proceeds to step S745.

In step S742, the notification subject selector 523 selects events subject to notification in descending order of priority up to the predetermined number of events. Here, when the number of events with a priority equaling to or more than the aforementioned boundary value does not exceed the predetermined number of events, in other words, the number of events with a priority equaling to or more than the aforementioned boundary values is the same as the predetermined number of events, the selection of events subject to notification completes with step S742. On the other hand, when the number of events with a priority equaling to or more than the boundary values exceeds the predetermined number of events, the notification subject selector 523 narrows down the events with the priority equaling the boundary values (step S744). For example, the notification subject selector 523 may use the aforementioned attributes of a requester, make random selection, or combine the two.

In step S745, the notification subject selector 523 will select all events that occur during the unit period as events subject to notification. Here, when the number of the selected events subject to notification is not less than the predetermined number of events, that is, when the number of the selected events subject to notification is equal to the predetermined number of events, the selection of events subject to notification completes with step S745. On the other hand, when the number of the selected events subject to notification is less than the predetermined number of events, the notification subject selector 523 further selects the aforementioned un-notified events as events subject to notification (step S747).

As explained above, the game server according to the first embodiment selects events subject to notification from events occurring during a unit period up to the predetermined number of events, and informs a player, and ultimately the audience, of the occurrence of the events subject to notification. Therefore, according to this game server, even when the occurrence of events is concentrated in a short time period, since notifications are done up to the predetermined number of events, it is possible to avoid a situation where game experience provided to a player and the audience fails while allowing the player and the audience to understand the game status to some extent. Also, the load on the game server due to notifications does not increase over a certain upper limit.

The Second Embodiment

Figure 9:
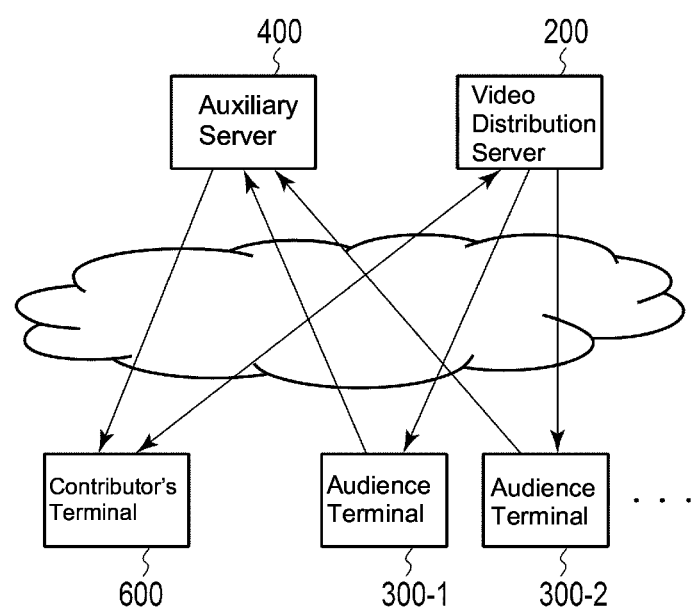
FIG. 9 is a block diagram showing an example of a distribution system of a real-time play video of the game, including a contributor's terminal according to the second embodiment.

The contributor's terminal according to the second embodiment can be integrated in a distribution system of a real-time play video of the game indicated in FIG. 9. The distribution system comprises a contributor's terminal 600, a video distribution server 200, audience terminals 300-1, 300-2, . . . , and an auxiliary server 400.

In the example of FIG. 9, the video distribution server 200 distributes a real-time play video of a stand-alone-type game or a P2P-type online game executed on the contributor's terminal 600 to the audience terminal 300 (and the contributor's terminal 600).

The video distribution server 200, the audience terminal 300 and the auxiliary server 400 in FIG. 9 can be the same as the video distribution server 200, the audience terminal 300 and the auxiliary server 400 in FIG. 1. However, "the contributor's terminal 100" and "the game server 500" in the explanation of FIG. 1 need to be replaced with "the contributor's terminal 600."

The contributor's terminal 600 executes a game program. Also, the contributor's terminal 600 must store the material data of the game in its main or auxiliary storage device. The contributor's terminal 600 according to the second embodiment can be called a game execution device.

The contributor's terminal 600 accepts the operation of a player and receives a request for generating an event from the auxiliary server 400. The contributor's terminal 600 transitions a game status based on the operation data of a player and the request for generating an event. The contributor's terminal 600 sequentially generates and outputs game screens/sounds based on the game status and game material data.

The player recognizes the output from the contributor's terminal 600, based on which the player inputs an operation into the contributor's terminal 600. The contributor's terminal 600 accepts the operation of a player and further transitions the game status. In addition, the contributor's terminal 600 sequentially encodes a game screen/sound, and if necessary, additional image/sound, and sends the data to the video distribution server 200.

The contributor's terminal 600 generates notification data that informs a player of the occurrence of at least a portion of the events that occur based on the operation data of the player and requests for generating events, as well as events that automatically occur according to the game progress. However, as explained below, the contributor's terminal 600 limits the number of events subject to notification during a unit period and does not notify events that exceed the predetermined number when the occurrence of events is concentrated in a short time period. By this, it is possible to avoid a situation where game experience provided to the player and the audience fails while allowing the player and the audience understand the game status to some extent. Also, the load on the contributor's terminal 600 due to notifications does not increase over a certain upper limit.

The contributor's terminal 600 can be a digital device such as a computer on which a game program can be executed; for example, it can be one similar to the contributor's terminal 100 in FIG. 1. The contributor's terminal 600 may be physically separated into a device that executes a game program (a game execution device) and one that encodes an image/sound and sends out the encoded multimedia data (an encoding/uploading device). Also, in such a case, game screen/sound data may or may not be sent out directly from the game execution device to the encoding/uploading device. In the latter case, for example, by capturing a screen of a display device connected to the game execution device and recording output sound from a speaker, the encoding/uploading device can import the game screen/sound data.

The number of each device indicated in FIG. 9 is only an example. For example, since the number of the audience terminal 300 changes from moment to moment, it can become 0, a few hundred or a few thousand. Also, a web server or a comment distribution server not shown in FIG. 9 may be provided.

The contributor's terminal 600, for example, comprises a processor that handles input and output control, communication control, and game execution (that is, event control, selection of events subject to notification, generation of notification data, etc.). Additionally, the contributor's terminal 600 comprises memory that temporarily stores a program that is executed by the processor to achieve the processing and data used by the processor, etc.

The contributor's terminal 600 may handle all data at an on-memory state, or a part of the data may be saved to an auxiliary storage device. The auxiliary storage device may be, for example, an internal or external HDD, an SSD or flash memory of the contributor's terminal 600, or a data base server that is accessible from the contributor's terminal 600.

Further, the contributor's terminal 600 may be a combination of a plurality of computers. For example, the functional unit of the contributor's terminal 600, that is, a communicator 610, a game executor 620, and various storages, which are explained later, may be distributed and implemented on separate computers.

The contributor's terminal 600 can further use a communication OF in order to connect to the network. The communication OF may be built into the contributor's terminal 600 or attached externally to the contributor's terminal 600.

The communication OF can be a module in order to communicate with the video distribution server 200 and the auxiliary server 400 via the network. For example, the communication OF sends (uploads) encoded data to the video distribution server. In addition, the communication I/F receives a request for generating an event from the auxiliary server 400. Further, the communication I/F can receive attribute data of a requester from the auxiliary server 400 or the video distribution server 200.

Additionally, the contributor's terminal 600 can use an input device for accepting user input. The input device may be built into the contributor's terminal 600 or attached externally to the contributor's terminal 600.

The input device may, for example, be a keyboard, a mouse, a numeric keypad, a microphone, a camera, or have the function of an output device such as a touch screen. The user input can typically be tapping, clicking, dragging, pressing down a certain key, etc. In addition, the user input can include, for example, sound that can be captured by a microphone, biometric data detected by a biometric sensor (e.g. body temperature, facial expression, etc.), location data identified by GPS (Global Positioning System) or base station information, user actions presumed based on acceleration data detected by an acceleration sensor (e.g. a user swung the contributor's terminal 600) and such.

Further, the contributor's terminal 600 can, for example, use an output device for outputting a game screen/sound/vibration. The output device may be built into the contributor's terminal 600 or attached externally to the contributor's terminal 600.

The output device can comprise a display device to display a moving image, a still image, a text, etc., a speaker to output sound, music, etc., a vibrator that vibrates in a desired pattern and such. The display device can be, for example, a liquid crystal display, an organic EL (electroluminescence) display, a CRT (Cathode Ray Tube) display, etc. The display device shows display data including contents. The display device may have the functions of an input device such as a touch screen.

Figure 10:
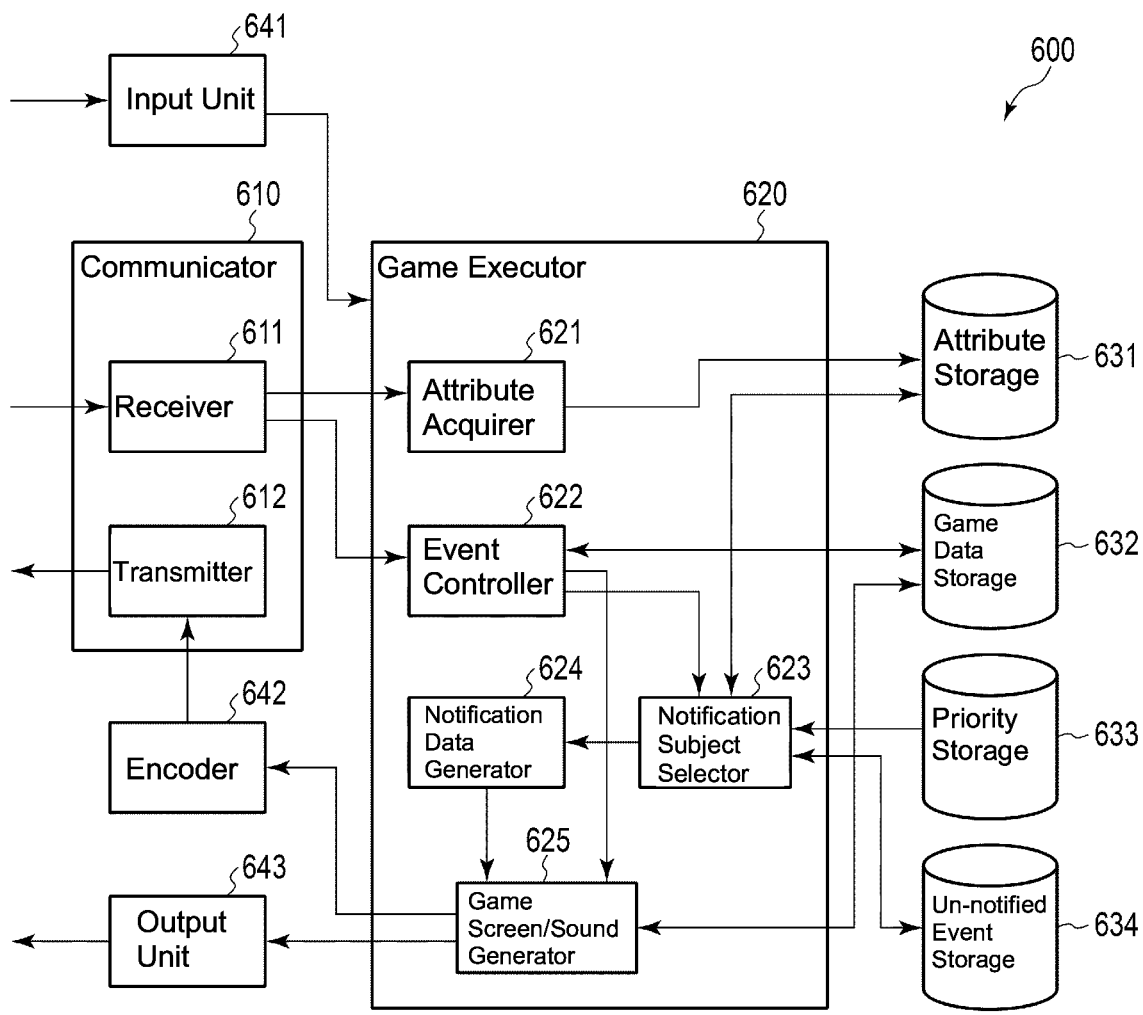
FIG. 10 is a block diagram illustrating the contributor's terminal in FIG. 9.

Next, the explanation of the configuration example of the contributor's terminal 600 continues using FIG. 10. The contributor's terminal 600 in FIG. 10 comprises the communicator 610, the game executor 620, various storages, an input unit 641, an encoder 642, and an output unit 643.

The communicator 610 may be, for example, the aforementioned communication I/F. It receives data from an external device, such as the video distribution server 200, the auxiliary server 400, etc., or sends data to external devices. Specifically, the communicator 610 comprises a receiver 611 and a transmitter 612.

The receiver 611 receives a request for generating an event from the auxiliary server 400. Also, the receiver 611 receives attribute data of the audience from the auxiliary server 400 or the video distribution server 200. The receiver 611 sends the received data to the game executor 620. Specifically, the receiver 611 sends attribute data of the audience to an attribute acquirer 621. Also, the receiver 611 sends a request for generating events at least to an event controller 622.

The transmitter 612 receives encoded data from the encoder 642 and sends the data to the video distribution server 200.

The game executor 620 may be the aforementioned processor and memory, and executes a game program. The game executor 620 receives data such as the operation data of a player and event generation requests from the input unit 641 and the communicator 610 and reads necessary data from various storages, based on which it transitions a game status and generates notification data. Further, the game executor 620 draws a game screen according to the transition of a game status and determines game sound (and vibration patterns) to be output. Then, the game executor 620 sends the game screen/sound to the encoder 642 and the output unit 643. Specifically, the game executor 620 comprises the attribute acquirer 621, the event controller 622, a notification subject selector 623, a notification data generator 624, and a game screen/sound generator 625.

However, the attribute acquirer 621 may be identical or similar to the attribute acquirer 521 in FIG. 2. The event controller 622 may be identical or similar to the event controller 522 of FIG. 2, except for the destination of data output indicating an event occurring in a game. The notification subject selector 623 may be identical or similar to the notification subject selector 523 in FIG. 2. The notification data generator 624 may be identical or similar to the notification data generator 524 in FIG. 2, except for the output destination of the notification data.

The game screen/sound generator 625 receives data, indicating an event that occurs in a game, from the event controller 622, receives notification data from the notification data generator 624, and retrieves game data (including material data) from a game data storage 632. The game screen/sound generator 625, based on the aforementioned data, draws a game screen, and determines game sound (and vibration patterns) to be output. The game screen/sound generator 625 sends the generated game screen/sound data to the encoder 642 and the output unit 643.

In the example of FIG. 10, various storages comprise an attribute storage 631, the game data storage 632, a priority storage 633, and an un-notified event storage 634. These storages can be the aforementioned memory alone or a combination of memory and auxiliary storage devices.

However, the attribute storage 631, the game data storage 632, the priority storage 633, and the un-notified event storage 634 may be identical or similar to the attribute storage 531, the game data storage 532, the priority storage 533, and the un-notified event storage 534. The game data stored in the game data storage 632 must contain material data necessary to generate the game screen/sound data.

The input unit 641 can, for example, be an input device, and accepts operation by a player. The input unit 641 generates operation data based on the operation of a player. The input unit 641 sends the operation data of a player to the game executor 620, for example, the event controller 622.

The encoder 642 can be the aforementioned processor or memory, or a dedicated hardware encoder. The encoder 642 receives and encodes game screen/sound data from the game screen/sound generator 625. For example, the encoder 642 encodes a game screen with default video codec (for example, H.264, H.265, etc.), and encodes sound with default sound codec (for example, AAC (Advanced Audio Coding)). Then, the encoder 642 sends the encoded data to the transmitter 612 in the form of a multimedia container such as mp4.

The output unit 643 can be the aforementioned output device. The output unit 643 receives game screen/sound data from the game screen/sound generator 625 and outputs them. That is, a display device displays a game screen, a speaker outputs game sound, or a vibrator vibrates according to a vibration pattern.

The operation of the contributor's terminal 600 can be understood by appropriately replacing the operation example of the game server 500 in FIG. 2, which is explained in FIG. 7. Specifically, the contributor's terminal 600 is different from the game server 500 in that the former directly receives the operation of a player, as well as that a game screen/sound is generated based on the execution results of a game program including notification data, and outputs the screen/sound on its own while encoding and uploading the data to the video distribution server 200.

As explained above, the contributor's terminal according to the second embodiment selects events subject to notification from events occurring during a unit period up to the predetermined number of events, and informs a player, and ultimately the audience, of the occurrence of the events subject to notification. Therefore, according to this contributor's terminal, even when the occurrence of events is concentrated in a short time period, since notifications are done up to the predetermined number of events, it is possible to avoid a situation where game experience provided to a player and the audience fails while allowing the player and the audience to understand game status to some extent. Also, the load on the contributor's terminal due to notifications does not increase over a certain upper limit.

Modifications

Any of the above embodiments controls events subject to notification in order to allow a player and the audience to understand game status to a certain extent. However, it is presumed that there is a need where events that fell through notification subjects can be grasped. Therefore, for example, an area displaying events that fell through notification subjects, or information of all events, such as a list showing which event occurred when and where, etc., (hereinafter referred to as "event list") may be provided outside a game screen. Such event list will not hinder a player or other audiences who are fixing their eyes on a game screen since it is displayed outside the game screen. Also, it can be configured in such a way a player and the audience can individually adjust a setting to display or not display the list on their terminals.

In the above-mentioned embodiment, some functional units were explained, but they are only examples of implementations of each functional unit. For example, a plurality of functional units that are explained to be implemented on one device can be implemented on a plurality of separate devices. Or, function units that are explained to be implemented on a plurality of separate devices can be implemented on one device.

The above-mentioned embodiment only illustrates a specific example in order to help understand the concept of the present invention, and does not intend to limit the scope of the present invention. The embodiments may be added with, removed of, or converted with various elements without departing from the scope of the present invention.

The various functional unit that are explained in each of the above embodiments can be realized by using a circuit. The circuit can be a dedicated circuit that realizes a specific function, or a general-purpose circuit such as a processor.

The processing of each of the above embodiments can be realized, at least partially, for example, by using a CPU mounted on a general-purpose computer, or a processor such as a microcomputer, an FPGA (Field Programmable Gate Array) or a DSP (Digital Signal Processor) as a basic hardware. A program that realizes the above processing can be stored and provided in a recording medium that is readable on a computer. The program is stored in the recording medium as a file in an installable or executable format. The recording medium includes a magnetic disc, an optical disc (CD-ROM, CD-R, DVD, etc.), a magneto-optical disc (MO, etc.), a semiconductor memory, etc. The recording medium can be any form as long as it is capable of storing a program and computer-readable. Also, the program that realizes the above processing can be stored on a computer (server) connected to a network such as the Internet and downloaded on a computer (client) via a network.

The invention claimed is:

1. A game executing device comprising:
   a receiver configured to receive a request for generating an event from an auxiliary server, the request for generating an event being based on a request for executing an intervention to a game from a terminal of an audience member of a live video of the game;
   an event controller configured to control the event that occurs in the game, at least in response to the request for generating the event and further configured to generate event data indicating events that occur in the game;
   a selector configured to select events subject to notification up to a predetermined number of first events that occur in the game during a first period among the events indicated in the event data, when a number of first events exceeds the predetermined number;

an acquirer configured to acquire attributes of a requester of each first events; and a generator configured to generate notification data to inform a player of the game of an occurrence of each event subject to notification, wherein a terminal of the player is configured to output at least one of a game screen or sound generated based on the event data and the notification data, the event data including event types of the events, wherein the selector is configured to select the events subject to notification in descending order based on priorities assigned to the first events up to the predetermined number of the first events, each priority of the priorities is predefined for each event type, wherein the selector is configured to select a portion of a plurality of second events assigned a priority equal to a boundary value as the events subject to notification based on attributes of one or more requesters of the second events when a number of the first events assigned priorities equal to or higher than the boundary value exceeds the predetermined number of the first events, and wherein the boundary value is equal to the priority that corresponds to the predetermined number of the first events when the first events are sorted in descending order based on the priorities assigned to the first events.

2. The game execution device according to claim 1, wherein the attributes of the requester include a starting time the requester started viewing the real-time play video of the game.

3. The game execution device according to claim 1, wherein the attributes of the requester include a time when the requester requested the execution of the intervention.

4. The game execution device according to claim 1, wherein the attributes of the requester include a number of times when events that occurred in the game in response to requests of the requester were selected as events subject to notification during any period in the real-time play video of the game.

5. The game execution device according to claim 1, wherein the notification data includes data in order to superimpose a sub-screen displaying the events subject to notification on a game screen.

6. The game execution device according to claim 1, wherein when the number of the first events is smaller than the predetermined number of events, the selector further selects events that occurred in the game during a second period, which precedes the first period, but were not selected as events subject to notification during the second period, as events subject to notification during the first period.

7. A game program for enabling a computer to function as:
means configured to receive a request for generating an event from an auxiliary server, the request for generating an event being based on a request for executing an intervention to a game from a terminal of the audience member of a live video of the game;

at least in response to the request for generating the event, means configured to control the event that occurs in the game and to generate event data indicating events that occur in the game;

means configured to select events subject to notification up to the predetermined number of first events that occur in the game during a first period among the events indicated in the event data when a number of first events exceeds the predetermined number;

means configured to acquire attributes of a requester of the first events; and means configured to generate notification data to notify a player of the game of an occurrence of each event subject to notification, wherein a terminal of the player is configured to output at least one of a game screen or sound generated based on the event data and the notification data, the event data including event types of the events;

wherein the means for selecting is configured to select the events subject to notification in descending order based on priorities of assigned to the first events up to the predetermined number of the first events, each priority of the priorities is predefined for each event type, wherein the means for selecting is configured to select a portion of a plurality of second events assigned a priority equal to a boundary value as the events subject to notification based on attributes of one or more requesters of the second events when a number of the first events assigned priorities equal to or higher than the boundary value exceeds the predetermined number of the first events, and wherein the boundary value is equal to the priority that corresponds to the predetermined number of the first events when the first events are sorted in descending order based on the priorities assigned to the first events.

8. The game program of claim 7, wherein the attributes of the requester include a starting time the requester started viewing the real-time play video of the game.

9. The game program of claim 7, wherein the attributes of the requester include a time when the requester requested the execution of the intervention.

10. The game program of claim 7, wherein the attributes of the requester include a number of times when events that occurred in the game in response to requests of the requester were selected as events subject to notification during any period in the real-time play video of the game.

11. The game program of claim 7, wherein the notification data includes data in order to superimpose a sub-screen displaying the events subject to notification on a game screen.

12. The program of claim 7, wherein when the number of the first events is smaller than the predetermined number of events, the selector further selects events that occurred in the game during a second period, which precedes the first period, but were not selected as events subject to notification during the second period, as events subject to notification during the first period.

13. A non-transitory computer readable medium storing the game program of claim 7.

* * * * *